US011778127B2

United States Patent
Rossignol et al.

(10) Patent No.: US 11,778,127 B2
(45) Date of Patent: Oct. 3, 2023

(54) ENHANCED SYNCHRONIZATION FRAMEWORK

(71) Applicant: X Development LLC, Mountain View, CA (US)

(72) Inventors: Andrew Rossignol, Mountain View, CA (US); Harrison Pham, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/869,576

(22) Filed: Jul. 20, 2022

(65) Prior Publication Data

US 2022/0368813 A1    Nov. 17, 2022

Related U.S. Application Data

(63) Continuation of application No. 17/315,787, filed on May 10, 2021.

(51) Int. Cl.
*H04N 5/067* (2006.01)
*H04N 23/56* (2023.01)
*H04N 23/66* (2023.01)

(52) U.S. Cl.
CPC ............ *H04N 5/067* (2013.01); *H04N 23/56* (2023.01); *H04N 23/66* (2023.01)

(58) Field of Classification Search
CPC .. H04N 5/067; H04N 5/2256; H04N 5/23203; H04N 5/04; H04N 23/56;

(Continued)

(56) References Cited

U.S. PATENT DOCUMENTS 6,621,913 B1    9/2003  de Vries
10,776,193 B1 *  9/2020  Karpagavinayagam ..................... G06F 11/0793

(Continued)

FOREIGN PATENT DOCUMENTS

CL    2019000039 A1    3/2019
CN    108040948          5/2018

(Continued)

OTHER PUBLICATIONS

International Search Report and Written Opinion in International Appln No. PCT/US2022/022403, dated Jul. 18, 2022, 14 pages.

(Continued)

*Primary Examiner* — Michael E Teitelbaum
(74) *Attorney, Agent, or Firm* — Fish & Richardson P.C.

(57) ABSTRACT

Methods, systems, and apparatus, including computer programs encoded on a computer storage medium that provides an enhanced synchronization framework. One of the methods includes a primary and a second device that receive configuration information which identifies one or more actions to be performed by the secondary device when it receives specified pulses of a sequence of pulses from the primary device. The primary device transmits a sequence of pulses. The primary and the secondary device receive a particular pulse from the sequence of pulses. The secondary device determines whether the particular pulse satisfies one or more predetermined criteria and generates an instruction based on the determination.

20 Claims, 6 Drawing Sheets

(58) Field of Classification Search
CPC ........ H04N 23/66; A01K 13/00; A01K 61/13; H05B 47/155; H05B 47/16; Y02A 40/81
See application file for complete search history.

(56) References Cited

U.S. PATENT DOCUMENTS

| | | | |
|---|---|---|---|
| 10,856,520 | B1 | 12/2020 | Kozachenok et al. |
| 10,863,727 | B2 | 12/2020 | Jans |
| 2006/0002110 | A1 | 1/2006 | Dowling et al. |
| 2012/0098980 | A1* | 4/2012 | Takahashi .......... H04N 5/23203 |
| | | | 348/E5.042 |
| 2013/0273599 | A1 | 10/2013 | Robitaille |
| 2014/0184089 | A1 | 7/2014 | Porter et al. |
| 2015/0136037 | A1 | 5/2015 | Boonekamp |
| 2017/0150701 | A1 | 6/2017 | Gilmore et al. |
| 2018/0000055 | A1 | 1/2018 | Tanase |
| 2018/0027637 | A1 | 1/2018 | Kurt |
| 2019/0228218 | A1 | 7/2019 | Barnaby et al. |
| 2019/0340440 | A1 | 11/2019 | Atwater et al. |
| 2019/0363791 | A1 | 11/2019 | Teo |
| 2020/0107524 | A1 | 4/2020 | Messana et al. |
| 2020/0113158 | A1 | 4/2020 | Rishi |
| 2020/0155882 | A1 | 5/2020 | Tohidi et al. |
| 2020/0288678 | A1 | 9/2020 | Howe et al. |
| 2020/0288679 | A1 | 9/2020 | Howe |
| 2020/0288680 | A1 | 9/2020 | Howe |
| 2021/0012118 | A1* | 1/2021 | Bohacik ............. H04N 5/23203 |
| 2021/0080715 | A1* | 3/2021 | Saxena ................ A01K 29/005 |
| 2021/0142052 | A1 | 5/2021 | James |

FOREIGN PATENT DOCUMENTS

| | | |
|---|---|---|
| EP | 2244934 | 11/2010 |
| EP | 2962556 | 1/2016 |
| EP | 3484283 | 5/2019 |
| GB | 2539495 | 12/2016 |
| JP | 2001190488 | 7/2001 |
| JP | 2002171853 | 6/2002 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2012/081990 | 6/2012 |
| WO | WO 2014/179482 | 11/2014 |
| WO | WO 2017/137896 | 8/2017 |
| WO | WO 2018/011744 | 1/2018 |
| WO | WO 2018/011745 | 1/2018 |
| WO | WO 2019/002881 | 1/2019 |
| WO | WO 2019/121851 | 6/2019 |
| WO | WO 2019/121900 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2020/180188 | 9/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Search Report and Written Opinion in International Appln No. PCT/US2022/022837, dated Aug. 2, 2022, 14 pages.
Extended Search Report in European Appln. No. 22151132.2, dated May 2, 2022, 10 pages.
International Preliminary Report on Patentability in International Appln. No. PCT/US2020/059829, dated May 27, 2022, 11 pages.
International Search Report and Written Opinion International Appln No. PCT/US2022/018651, dated Jun. 22, 2022, 14 pages.
International Search Report and Written Opinion International Appln No. PCT/US2022/021683, dated Jun. 27, 2022, 14 pages.
International Search Report and Written Opinion International Appln No. PCT/US2022/022250, dated Jul. 6, 2022, 15 pages.
International Search Report and Written Opinion International Appln No. PCT/US2022/022492, dated Jun. 28, 2022, 13 pages.
International Search Report and Written Opinion International Appln No. PCT/US2022/022589, dated Jul. 7, 2022, 12 pages.
International Search Report and Written Opinion International Appln No. PCT/US2022/023831, dated Jul. 8, 2022, 13 pages.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Odey, "AquaMesh—Design and Implementation of Smart Wireless Mesh Sensor Networks for Aquaculture," American Journal of Networks and Communications, Jul. 2013, 8 pages.
PCT International Search Report and Written Opinion in International Appln. No. PCT/US2020/059829, dated Feb. 25, 2021, 18 pages.
PCT International Search Report and Written Opinion in International Appln. No. PCT/US2020/066800, dated Mar. 11, 2021, 15 pages.
PCT International Search Report and Written Opinion in International Appln. No. PCT/US2021/023104, dated Jun. 18, 2021, 13 pages.
Petrov et al., "Overview of the application of computer vision technology in fish farming," E3S Web of Conferences, 2020, 175:02015.
Qiu et al., "Improving Transfer Learning and Squeeze-and-Excitation Networks for Small-Scale Fine-Grained Fish Image Classification," IEEE Access, Dec. 2018, 6(31):78503-78512.
Saberloon et al., "Application of Machine Vision Systems in Aquaculture with Emphasis on Fish: State-of-the-Art and Key Issues," Reviews in Aquaculture, Dec. 2017, 9:369-387.
Stein et al., "Consistent melanophore spot patterns allow long-term individual recognition of Atlantic salmon Salmo Salar," Journal of Fish Biology, Nov. 2017, 91(6):1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.

* cited by examiner

ENHANCED SYNCHRONIZATION FRAMEWORK

CROSS REFERENCE TO RELATED APPLICATION

This application is a continuation of U.S. application Ser. No. 17/315,787, filed May 10, 2021, the contents of which are incorporated by reference herein.

TECHNICAL FIELD

This specification relates to controllers, and one particular implementation describes a framework for synchronizing lighting and camera controllers.

BACKGROUND

A controller is a device that interfaces with one or more connected devices, and that is responsible for orchestrating the operation of connected devices. Examples of connected devices that are controlled by controllers include illumination devices, such as light sources, and imaging devices, such as cameras.

Illumination devices and imaging devices are used to monitor organisms that are raised in an aquaculture or agriculture environment. For example, an illumination device might illuminate a farmed fish, and an imaging device might generate images of the illuminated fish. Such images can be used to estimate the health of a farmed fish, for example to detect the presence of ectoparasites such as sea lice.

SUMMARY

This specification describes a framework implemented as computer programs on one or more computers in one or more locations that synchronize controllers in an aquaculture or agriculture environment. More specifically, this specification describes a framework that uses configuration information that is present at primary and secondary controller to control synchronized actions of devices connected to controllers. Actions can include turning on or off an underwater illumination device, or capturing an image or video of an underwater region, among other actions. Such techniques can also be used to achieve flicker fusion of the light produced by different illumination devices. Flicker fusion is important as it avoids the occurrence of flicker, which can be discernable by fish and can result in reduced well-being of the fish.

Particular embodiments of the subject matter described in this specification can be implemented so as to realize one or more of the following advantages. The techniques described below can synchronize devices in an aquaculture or agriculture environment. Synchronizing illumination with image capture allows the framework to create accurate images at various points in time. Accurate images are critical to identifying parasite infestations, for example, by applying trained machine learning models to the images.

In addition, the techniques described below allow for the dynamic adjustment of synchronized behaviors. Since the framework can operate in an aquaculture environment where it is difficult to access the physical equipment, the ability to adjust the behavior saves time and operational cost.

Further, the techniques described below allow the synchronization of an image capture device, such as a camera, with multiple illumination devices that can produce illumination at different frequencies. Producing images of parasites, such as sea lice, illuminated with different frequencies, then providing those images to a parasite-recognition system results in more accurate parasite identification. Therefore, it is beneficial to synchronize the operation of imaging devices with illumination devices that produce light of different frequencies. In addition, the illumination devices must be synchronized with each other.

One aspect features a primary and a second device that receive configuration information which identifies one or more actions to be performed by the secondary device when it receives specified pulses of a sequence of pulses from the primary device. The primary device transmits a sequence of pulses. The primary and the secondary device receive a particular pulse from the sequence of pulses. The secondary device determines whether the particular pulse satisfies one or more predetermined criteria and generates an instruction based on the determination.

One aspect features a secondary device that receives configuration information which identifies one or more actions to be performed by the secondary device upon receipt of specified pulses of a sequence of pulses from a primary device. The secondary device receives from the primary device a particular pulse of the sequence of pulses. The secondary device determines whether the particular pulse satisfies one or more predetermined criteria and generates an instruction based on determining whether the particular pulse satisfies the one or more predetermined criteria.

One or more of the following features can be included. The instruction can be an indication to illuminate a light source. The instruction can be an indication to capture at least one image. The secondary device can determine whether the pulse satisfies one or more predetermine criteria by determining a first time at which the pulse was received and a second time at which the secondary device predicted it would receive the pulse, and determining a duration between the first time and the second time. The secondary device can determine that the duration is less than a configured threshold and generate the instruction. The secondary device can determine that the duration is greater than a configured threshold, generate an error value, and transmit the error value to the primary device. The primary device can receive the error value and perform a reset action. The secondary device can be a fish-illumination device. The secondary device can be a fish-imaging device.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
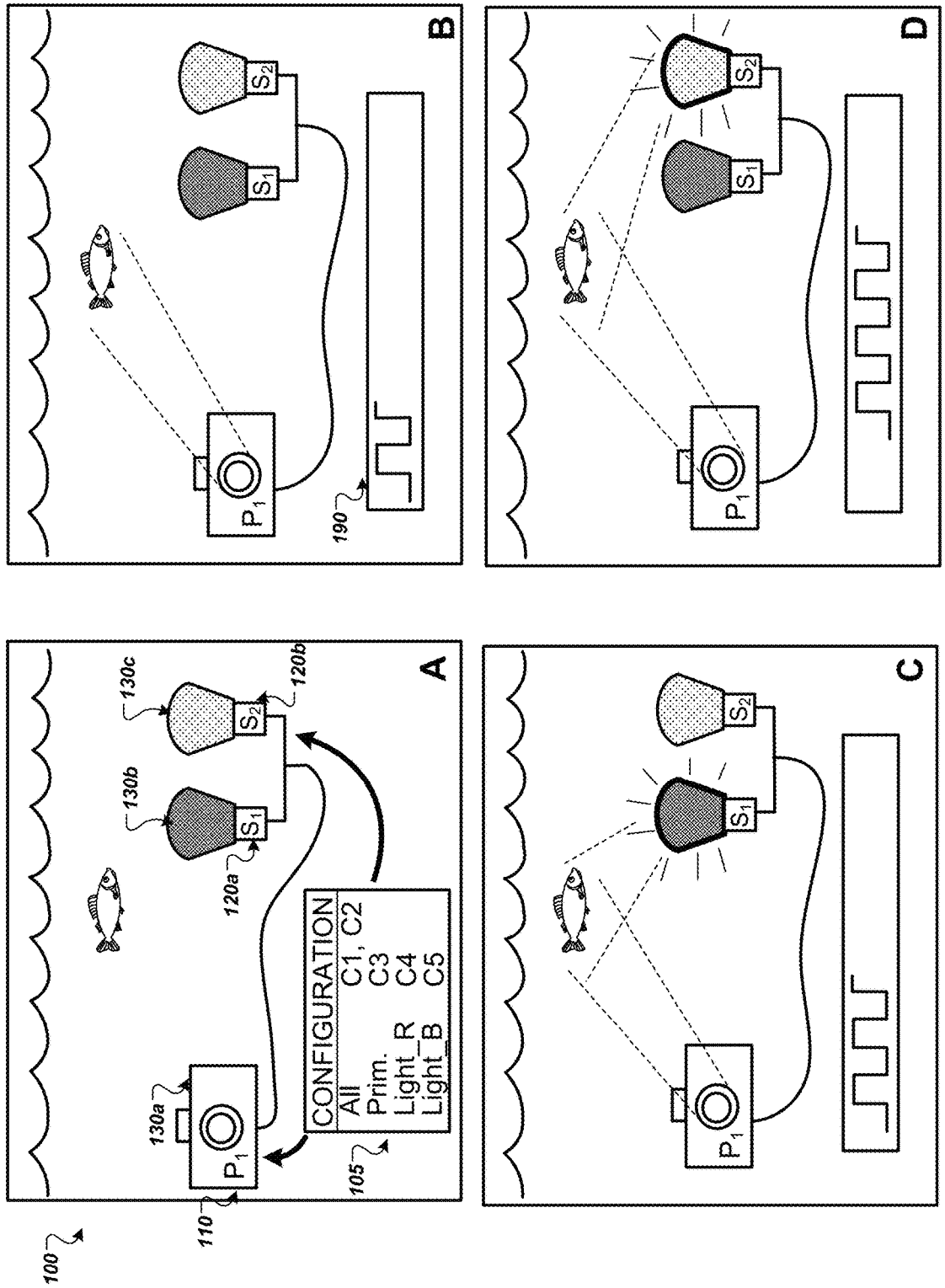
FIG. 1 depicts an example of a controller synchronization framework that synchronizes devices used to monitor aquaculture environments.

FIG. 1 depicts an example of a controller synchronization framework 100 that synchronizes devices used to monitor aquaculture environments. Briefly, the devices include one primary controller 110 and two secondary controllers 120a, 120b. Each controller has at least one associated device. As illustrated, the primary controller 110 has an associated camera 130a; a red secondary controller 120a has an attached illumination device 130b that is configured to produce red light (for example, using a red LED); and a blue secondary controller 120b has an attached illumination device 130c that is configured to produce blue light (for example, using a blue LED). To ensure that the images of organisms in the aquaculture environment produced by the camera 130a are correct, the operation of the camera 130a, red secondary controller 120a and blue secondary controller 120b must remained synchronized.

Aquaculture includes the farming of marine organisms such as fish, crustaceans and mollusks. Aquaculture is important to the health of marine ecosystems, which can suffer from overharvesting. Experience indicates over half of all fish and shellfish come from aquaculture, and in the absence of aquaculture, substantial, and perhaps irreversible, strain on marine ecosystems could result.

One challenge that exists in aquaculture is parasites, such as sea lice, which can cause skin erosion and hemorrhaging, gill congestion, and increased mucus production. Parasites harm both the welfare of the organisms being farmed, and the yield produced by an aquaculture environment. Thus, the detection and reduction of parasites in an aquaculture environment provides multiple benefits.

Mitigating the impact of parasites first requires identifying a parasitic infestation. Only after an organism, such as a fish, has been identified as being infested with parasites, such as sea lice, can mitigation techniques can be applied. For example, if a fish is known to be infested, lasers aimed at the sea lice on the fish can be used to destroy the sea lice, or the fish can be identified and removed for delousing.

It has been shown that illuminating sea lice with light of certain frequencies enables sea lice detection. For example, images of fish illuminated with light of a given frequency can be passed to a trained machine learning model that can predict whether the fish is infested with sea lice. Such predictions greatly reduce the cost and complexity of identifying sea lice infections.

In addition, it has been further shown that by illuminating fish with light of two frequencies, one at a time, multiple images can be produced, and using these multiple images, trained machine learning models more accurately predict whether the fish is infested with sea lice.

However, it presents a substantial technical challenge to synchronize the controllers that operate the various devices involved in illuminating fish with multiple frequencies, each produced at a different time, and capturing images with image capture devices each configured to capture images at a particular image capture frequency. Each controller must determine the times at which it must perform its configured actions, and these actions must remain synchronized throughout their operation since synchronization failures can result in faulty images, and ultimately, failing to detect parasites. In addition, when one or more controller becomes unsynchronized, an error indicator must be produced so remedial actions can be taken.

In FIG. 1, the synchronization is illustrated in four stages, stage A to stage D. In stage A, configuration information 105 is delivered to each of the controllers (110, 120a, 120b). The configuration information 105 provides to the controllers a description of various operational parameters, as described in further detail below.

In this example, a primary controller 110 also generates timing pulses used to synchronize the behavior of the controllers, and by extension, the devices connected to the controllers. The primary controller 110 uses an attached pulse generation device (not shown) to generate the pulses, which are also referred to by this specification as "synch pulses" or "synchronization pulses." Each controller in this framework also contains a timing device used by the framework to coordinate operation. Preferably, the primary controller's timing device is higher precision (for example, the oscillator within the timer can produce a signal at a higher frequency and at a lower error rate) than the timing devices within the secondary controllers (120a, 120b). Requiring only lower precision timers at secondary controllers (120a, 120b) can results in cost savings as lower precision timers can be less expensive than higher precision timers.

All three devices receive configuration information 105. The configuration information 105 includes instructions that determine the operation of the controllers. In this example, the configuration information includes four sections, one for all controllers, and one for the primary controller 110; one for controllers that produces red light 120a; and one for a controllers that produce blue light 120b. The configuration information is essential to the synchronization framework as it ensures that all controllers possess the information required to perform synchronized operations.

The portion of the configuration information 105 directed to all controllers contains two configuration parameters, C1 and C2. For example, one parameter, C1, can stated that the pulse rate is 120 Hz, meaning a pulse should arrive every $120^{th}$ of a second. The second parameter, C2, can indicate that controllers should instruct their image capture devices to capture light for $1/1024^{th}$ of a second.

The portion of the configuration information 105, C3, directed at the primary controller 110 indicates that the primary controller 110 should use its associated capture device 130a to capture an image at every other pulse. In addition, from the portion of the configuration information 105 directed at all controllers, and specifically the statement regarding image capture time, the primary controller 110 determines that it will to capture images for $1/1024^{th}$ of a second. Since the primary controller 110 also generates the pulses, from the portion of the configuration information 105 directed to all controllers, it determines that it will generate pulses at 120 Hz.

The portion of the configuration information 105 directed to red controller 120a, C4, can state that the red controller 120a should instruct its associated device 130b to illuminate upon receiving every second pulse beginning when the third pulse is received. From the portion of the configuration information 105 directed to all controllers, the red controllers 120a can determine that pulses should arrive every $120^{th}$ of a second. Therefore, the second pulse should arrive after 2/120ths (or $1/60^{th}$) of a second at which time, at which time the red controller 120a should instruct its associated device 130b to illuminate for $1/120^{th}$ of a second. Subsequently, upon receipt of every other pulse—that is, at pulse 3, 5, 7, 9 and so on—the red controller 120a instructs its associated device 130b to illuminate for $1/120^{th}$ of a second.

While the configuration information in this example has sections marked "Red" or "_R" and "Blue" or "_B" those characters are simply tokens that are compared against a definition stored in each controller. For example, in this example, the red secondary controller 120a can be preconfigured with the token "Red," which directs the red secondary controller 120a to process the "Red" portion of the configuration file. For readability, it is preferable for a controller configured by the "Red" section of a configuration file to operate a device that produces red light, but that is not a requirement.

In addition, while the example includes sections marked "Red" and "Blue," configuration information can include sections directed at an arbitrary number of labels. For example, a configuration file could contain, in addition to or instead of sections lists, sections labeled "Green," "Yellow," "Blue," and so on. In some implementations, sections of the configuration information marked by those color designations can correspond to controllers that operate illumination devices that produce green, yellow and blue light, respectively, and more broadly, any color of light be can used.

Further, the tokens labeling sections need not correspond to colors, provided they correspond to information configured at controllers. For example, a section intended to configure controllers associated with red illumination devices could be marked "Device Type A," provided such controllers are also configured to process the "Device Type A" section of the configuration information. Such flexibility can be used, for example, if the illumination device produces light of a frequency outside the visible range.

As noted above, the primary controller 110 has been configured to trigger its associated device 130a to capture images upon receiving every pulse starting at pulse 3. Since the red secondary controller 120b is now configured to trigger its associated illumination device 130b on pulses 3, 5, 7, and so on, the camera 130a and the red illuminator 130b are now synchronized to operate on pulses 3, 5, 7, etc., allowing the system 100 to properly capture red-illuminated images.

The portion of the configuration information 105 directed to the blue controller 120b, C5, can indicate that the blue controller 120b should instruct its associated device 130c to illuminate upon receiving every second pulse beginning when the fourth pulse is received. From the portion of the configuration information 105 directed to all controllers, the blue controller 120b can determine that pulses should arrive every 120th of a second. Therefore, the fourth pulse should arrive after 4/120ths (or 1/30th) of a second at which time, at which time the blue controller 120b should instruct its associated device 130c to illuminate for 1/120th of a second. Subsequently, upon receipt of every second pulse—that is, at pulse 2, 4, 6, 8, and so on—the second secondary controller 120b instruct its associated device 130b to illuminate for 1/120th of a second.

Since the primary controller 110 has been configured to trigger its associated device 130a to capture images upon receiving every pulse starting at pulse 3, and the blue secondary controller 120b is now configured to trigger its associated illumination device 130b on pulses 4, 6, 8, and so on, the camera 130a and the blue illuminator 130b are now synchronized to operate on pulses 4, 6, 8, etc., allowing the system 100 to properly capture blue-illuminated images.

More complex structures for configuration information 105 can also be used. For example, configuration information can optionally include variables, mathematical operations, loops, conditionals, etc. In addition, the framework can have default values used by all controllers unless overridden by a value listed in the configuration information. For example, if the default pulse is 120 Hz, and "pulse rate" is not listed in the configuration information 105, then all controllers can use 120 Hz. However, if a pulse rate of 110 Hz is listed in the configuration information, then all controllers can use 110 Hz instead, despite the default pulse rated of 120 Hz.

In addition, various settings in the configuration information can cause, for example, illumination devices to operate at the same time (for example, to create light produced from multiple frequencies); a camera to capture images with no illumination; a camera to capture images with extended exposures that include illumination by one frequency, then a second frequency; a camera to capture an image as an illumination source is turning on or off; and so on.

In stage B of FIG. 1, the pulse 190 indicates that system is at time two—after the configuration information has been delivered to all controllers, and at the arrival of a second pulse. All controllers are prepared to execute, but have not yet performed any active steps.

In stage C of FIG. 1, a third pulse is generated and received. The primary controller 110 has broadcast its third pulse that is received by the red secondary controller 120a and the blue secondary controller 120b. The primary controller 110, having been instructed by the configuration information 105 to capture an image at every pulse, activates its image capture device 130a for $1/1024^{th}$ of a second. The red secondary controller 120a activates its illumination device 130b for $1/120^{th}$ of a second. The blue secondary controller 120b takes no action as it acts first when receiving the fourth pulse and subsequently on even numbered pulses. (Optionally, to account for the time necessarily to bring an illumination device to full intensity, imaging devices can be configured to delay image capture by a fixed period of time, or by a period listed in the configuration information.) Thus the image capture device 130a and the red illuminator 130b have been properly synchronized. In addition, since the blue illuminator 130c is quiescent at these times, no interfering frequencies would pollute the image.

In stage D of FIG. 1, the primary controller generates a fourth pulse, which is received by the red secondary controller 120a and the blue secondary controller 120b. The primary controller 110, having been instructed by the configuration information 105 to capture an image at every pulse, again activates its image capture device for $1/1024^{th}$ of a second. The blue secondary controller 120b activates its illumination device 130b for $1/120^{th}$ of a second. The red secondary controller 120a takes no action as it acts only on pulses 3, 5, 7, etc., and not on pulse 4. Thus the image capture device 130a and the blue illuminator 130a have been properly synchronized.

The system would continue operating in this manner, with the primary controller 110 issuing pulses every $1/120^{th}$ of a second and capturing images, with the secondary controllers 120a, 120b continuing to alternate illuminations.

To summarize, FIG. 1 illustrates the importance of synchronization to the operation of the system. Specifically, if illumination times are not coordinated with image capture times, and with each other (to avoid multiple illumination devices emitting light at different frequencies), captured images will be improperly illuminated, either being completely dark (the absence of either blue or red light), or illuminated by the wrong frequency of light (for example, a combination of blue and red light, such as purple).

In turn, such defective images, when passed to a trained machine learning model, can result in incorrect predictions of parasite infestations from the machine learning model. Such incorrect predictions can cause the system to overlook instances of sea lice infestation.

Figure 2:
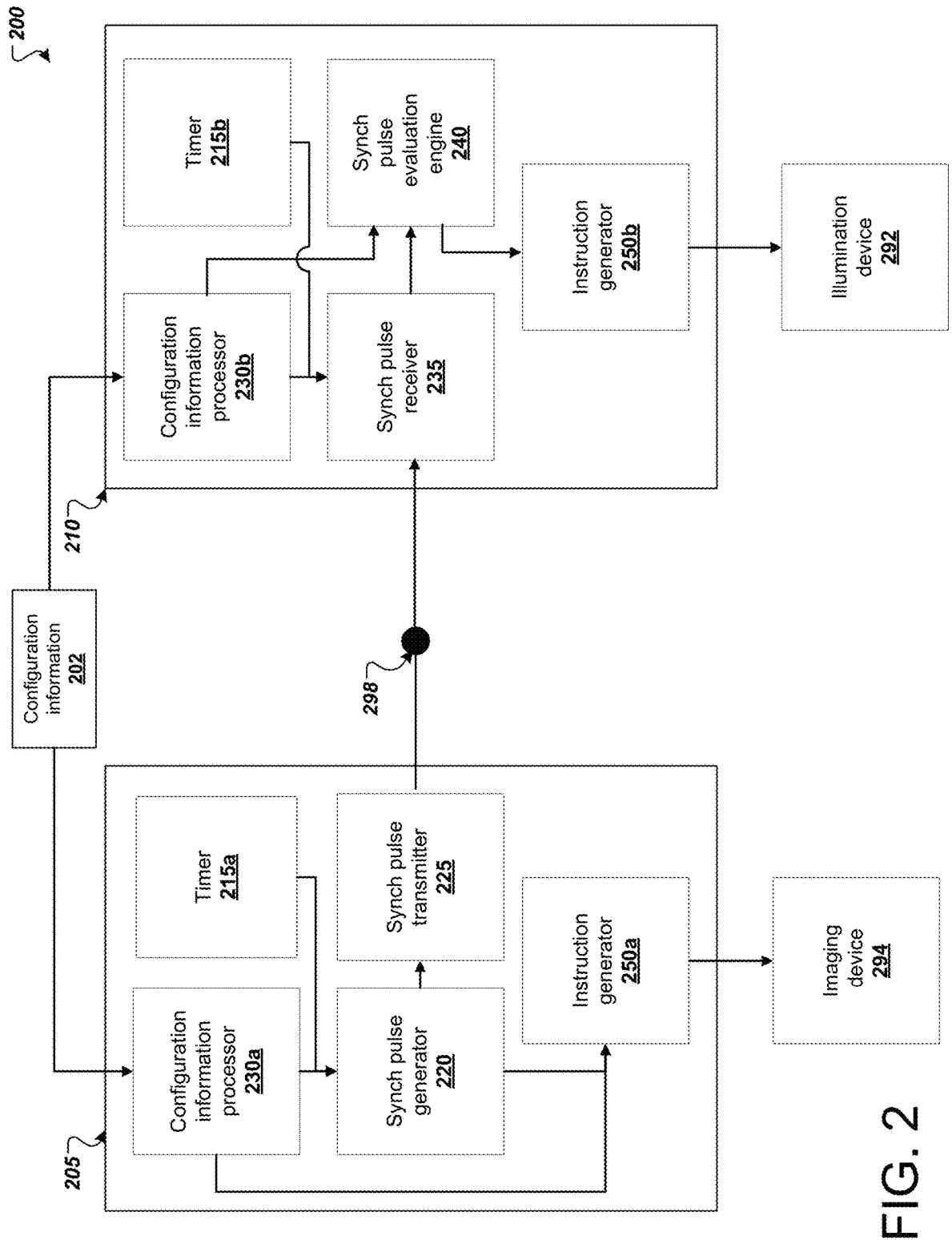
FIG. 2 is a block diagram of an example controller synchronization system.

FIG. 2 is a block diagram of an example controller synchronization system. The purpose of a controller system 200 can be to capture images of an aquaculture environment at precise intervals, where each image is illuminated by a light of a given frequency, and the frequency used can vary from image to image. For example, illumination might alternate between red (approximately 430 terahertz) and blue (750 terahertz). The captured images can be used by a trained machine learning system to identify parasites, such as sea lice, on fish or other species in the aquaculture environment. The controller synchronization system 200 ensures that operation of the controllers is synchronized—e.g., red illumination when red is expected, blue illumination when blue is expected, and images taken when illumination is present—which is essential to ensuring that images are captured correctly.

The controller synchronization system 200 can have one or more primary controllers 205 and one or more secondary controllers 210. The primary controller 205 can be coupled to the secondary controllers 210 by cables such as any cable capable of carrying GPIO (General purpose input/output) signals. In addition, as described with reference to FIG. 1, the operation of primary controllers 205 and secondary controllers is guided by configuration information 202. Controllers 205, 210 can have attached devices such as illumination devices 292 and imaging devices 294.

The primary controller 205 is responsible for generating pulses which, when received by secondary controllers 210, can cause the secondary controller 210 to take one or more actions. The pulse 298 can be a message sent over the cable transmitted as light, sound, electricity, and so on. In addition, the primary controller 205 can manage the operation of one or more connected devices 294, such as imaging and/or illumination devices, in response to timer events.

The primary controller 205 is comprised of a number of subcomponents including a configuration information processor 230a, a timer 215a, a synch pulse generator 220, a synch pulse transmitter 225 and an instruction generator 250a.

The configuration information processor 230a can receive configuration information 202 and provide the relevant information to other primary controller 205 subcomponents. For example, the configuration information processor 230a can provide to the synch pulse generator 220 the frequency at which pulses are to be generated. It can provide to the instruction generator 250a the frequency at which its attached devices (in this case, imaging device 294) should operate and (where appropriate) for what duration.

The timer 215a can generate clock pulses at a particular clock frequency. The clock can be, for example, a quartz crystal oscillator that creates a stable, periodic electromagnetic signal or vibration.

The synch pulse generator 220 translates clock pulses into synch pulse events. This translation is necessary since clock pulses from quartz oscillators often arrive at a frequency substantially higher than an appropriate synch pulse frequency. In addition, since the configuration information 202 can provide for different synch pulse frequencies, and oscillators typically produce clock pulses at a single rate, translation is necessary to support the flexibility provided by the configuration information 202 component of the synchronization framework.

Figure 3:
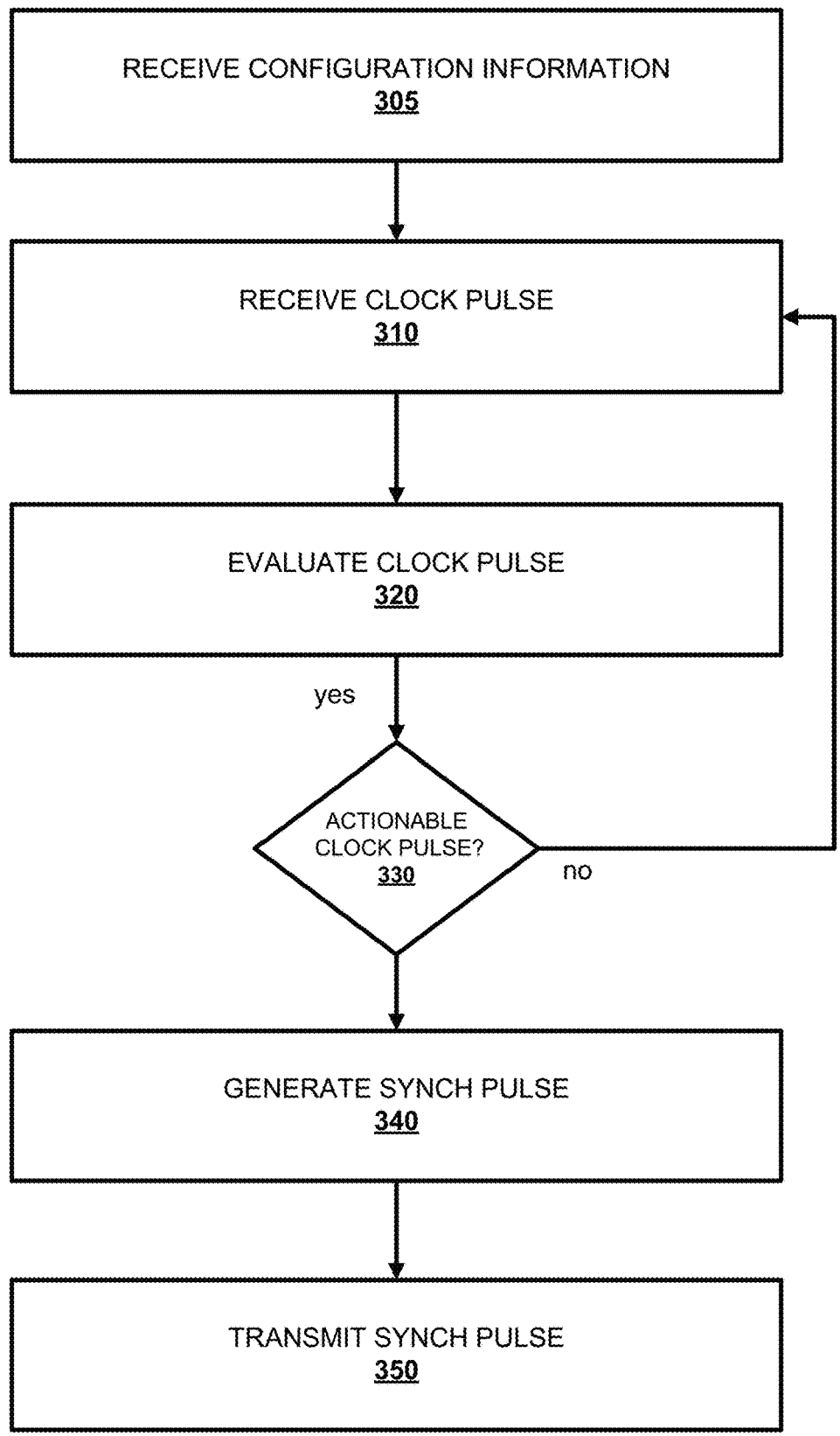
FIGS. 3, 4 and 5 are flow diagrams of example processes to synchronize controllers.

More specifically, the synch pulse generator 220 can receive clock pulses from the timer 215a and determine when the synch pulse transmitter 225 should transmit a pulse by translating clock pulses into synch pulses as described in more detail in reference to FIG. 3.

The synch pulse transmitter 225, upon receiving a signal from the synch pulse generator 220, produces and transmits a pulse 298. For example, the synch pulse transmitter 225 can transmit an electrical signal over a cable connecting the primary controller 205 to the secondary controller 210.

The instruction generator 250a can be responsible for triggering devices attached to the primary controller 205. As noted above, the instruction generator 250a can receive configuration information from configuration information processor 230a and pulse information from the synch pulse generator 220. The configuration information can include, for each device type, the pulse frequency (e.g., every $4^{th}$ pulse), pulse offset (e.g., starting at pulse 2) and duration of operation. The instruction generator 250a can count the pulses as they arrive, and upon determining (based on the configuration information) that a device should be activated 294, signal the device to operate. Optionally, the signal passed to the device 294 can include an indication of the duration the operation should last, along with other operational parameters.

The secondary controller 210 is responsible for managing the operation of one or more connected devices 292, such as imaging and/or illumination devices, in response to received pulse.

The secondary controller 210 can be comprised of a configuration information processor 230b, a timer 215b, a synch pulse received 235, a synch pulse evaluation engine 240 and an instruction generator 250b.

Some subcomponents of the secondary controller 210 operate analogously to the corresponding components in the primary controller 205. Specifically, the timer 215b of the secondary controller 210 can operate analogously to the timer 215a of the primary controller 205; the configuration information processor 230b of the secondary controller 210 can operate analogously to the configuration information processor 230a of the primary controller 205; and the instruction generator 250b of the secondary controller 210 can operate analogously to the instruction generator 250a of the primary controller 205.

The synch pulse receiver 230 receives pulses 298 transmitted by the synch pulse transmitter 225 of the primary controller 205 and provides an indication of the synch pulse to the synch pulse evaluation engine 240.

The synch pulse evaluation engine 240 is responsible for validating the timing of a received synch pulse 240. The synch pulse evaluation engine 240 can receive from the configuration information processor 230b information describing the configured frequency at which pulses should arrive. It can receive from the timer 215b clock pulses, and use a count of these pulses to keep track of elapsed time. The synch pulse evaluation engine 240 can then compare the elapsed time to the time at which the next synch pulse 298 is expected to arrive. If the actual arrival time does not differ from the expected arrival time by more than a configured threshold—that is, the pulse arrived approximately when it was expected—the synch pulse evaluation engine 240 can pass the pulse to the instruction generator 250b.

Figure 4:
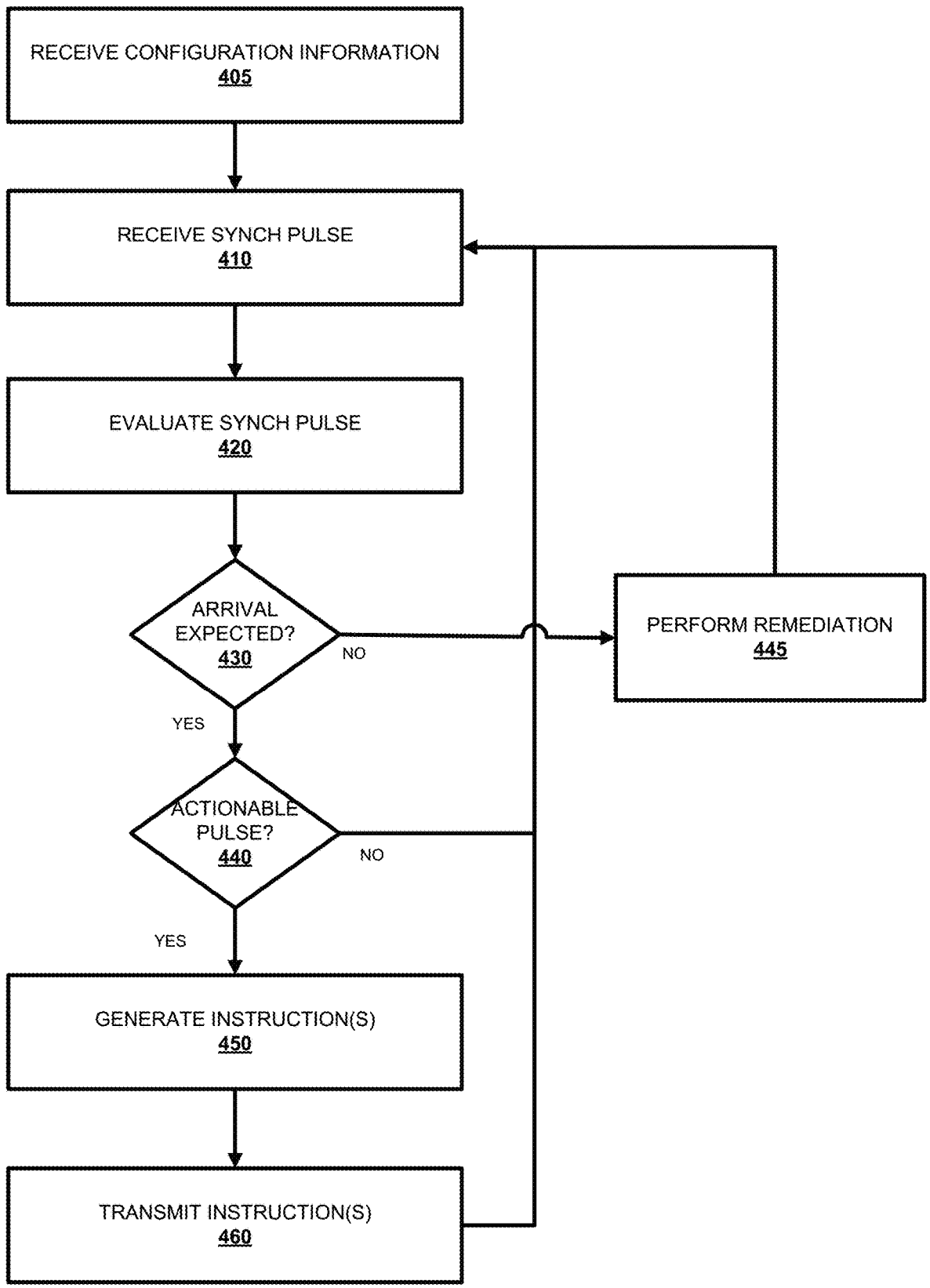

Conversely, if the actual arrival time does differ from the expected arrival time by more than a configured threshold—that is, the pulse did not arrive approximately when it was expected—the synch pulse evaluation engine 240 can ignore the pulse and take remedial action as described further in reference to FIG. 4.

Configuration information 202 provides information used to guide the operation of the primary controller 205 and the secondary controller 210. Configuration information can be expressed in any of numerous formats used to encode configuration information, such as a text document; an XML-formatted document such one using JSON (JavaScript Object Notation); binary encoding; and so on.

Configuration information 202 can be encrypted to complicate attempts to tamper with the document. For example, configuration information 202 can be encrypted with a public key and controllers 205, 210 can be configured with a corresponding private key.

Configuration information 202 can contain information used to guide the operation of the controllers. For example, it can include the frequency at which pulses are generated, the frequency at which images are to be captured, the frequency and duration of illumination periods of each light frequency used, and so on.

Configuration information 202 can contain all necessary information required to guide the operation of the controllers 205, 210, only contain information needed to override default settings of a controller, or any combination.

FIG. 3 is a flow diagram of an example process used to synchronize controllers, and more specifically, a process used by a primary controller to generate and transmit a synchronization (synch) pulse.

In step 305, the system receives configuration information used to guide the operation of the controller synchronization system. The format of configuration information was described previously in reference to FIG. 2.

In step 310, the system receives a clock pulse. The clock pulse can be received from an internal clock, such as a crystal oscillator or from an external clock.

In step 320, the system evaluates the clock pulse in reference to the system's synch pulse rate. For example, if the clock produces clock pulses at 12 kHz (12,000 pulses per second) and the configuration information indicates that pulses should be produced at 120 Hz (120 pulses per second), then the system will determine that an actionable pulse should be generated every 100 clock pulses. The ratio of clock pulses to actionable pulses is defined as the "actionable pulse number." The system can count the number of clock pulses received, and when the count equals or exceeds the actionable pulse number, the system resets the count to zero and generates an indication of an actionable clock pulse. If a clock pulse is received and the count is below the actionable pulse number, the system generates an indication of an in-actionable clock pulse.

In decision step 330, if the system receives an indication of an in-actionable pulse, it returns to step 310 to receive a subsequent clock pulse. Instead, if the system receives an indication of an actionable clock pulse, it proceeds to step 340.

In step 340, the system generates a synch pulse. A synch pulse can be any data understood by the system to be a synch pulse. For example, a synch pulse can indicated by rising or falling voltage edges from a GPIO signal.

In step 350, the system transmits the synch pulse. The system can transmit the synch message using any technique appropriate for the physical connection between the primary and secondary controller. For example, if the connection is a GPIO-compatible cable, the system can use a GPIO driver coupled to a GPIO port to transmit the message.

FIG. 4 is a flow diagram of an example process used to synchronize controllers, and more specifically, a process used by a secondary controller to operate a device upon receipt of a valid synchronization (synch) pulse.

In step 405, the system receives configuration information. Configuration information was described previously in reference to FIGS. 2 and 3.

In step 410, the system receives a synch pulse. The system can receive the synch pulse using any technique appropriate for the physical connection between the primary and secondary controller. For example, if the connection uses a GPIO-compatible cable, the system can use an GPIO driver coupled to an GPIO port to receive the message.

In step 420, the system evaluates the synch pulse in reference to the system's synch pulse rate. For example, to determine whether a synch pulse arrives at an expected time, the system can count the number of clock pulses received. When a synch pulse arrives, the system can compare the count to the actionable pulse number (previously explained in reference to FIG. 3). If the count is within a configured threshold of the actionable pulse number, the system determines that arrival is expected. Conversely, if the count is not within a configured threshold of the actionable pulse number, the system determines that arrival is not expected. When the system determines that arrival was expected, it can reset the count to zero.

In decision step 430, if the arrival was expected, the system proceeds to step 440; if the arrival was not expected, the system proceeds to step 445.

In decision step 440, the system determines whether the pulse is actionable for at least one connected device. First, the system determines the list of devices attached to the controller. Then, for at least one attached device, the system determines portion of the configuration information relevant to that controller. For example, the configuration information can include the pulse offset and frequency for the device operation. (Pulse offset and frequency were described in reference to FIG. 2.) When each pulse is evaluated in step 440, the system increments a pulse count. If the pulse count corresponds to the pulse offset and frequency for at least one device, the system proceeds to step 450 for that device, and conveys an indication of the device(s) that should be activated. If the pulse count does not correspond to the pulse offset and frequency for at least one device, the system returns to step 410 to await a new synch pulse.

In step 450, the system has received, as a result of step 440, a list of devices that are to be activated. The system generates instructions appropriate for the device(s) by using the configuration information obtained in step 405. The instructions will differ by device. For example, for an illumination device, the configuration can include the duration the illumination should last. If the illumination device can illuminate in multiple frequencies, the configuration information can include the frequency to be used. For an imaging device, the configuration can include imaging parameters such as exposure length, aperture, etc., depending on the capabilities of the imaging device.

In step 460, the system passes the instructions generated in step 450 to the one or more activated devices. The instructions can be passed, for example, by device controller subsystems specific to the device type. Once step 460 is complete, the system can return to step 410 to await a new synch pulse.

Retuning to step 445, at this point, the system has determined that the pulse was not expected, and remediation can be required. In some implementations, the system can transmit a message including an error indicator to the primary controller, to a master controller responsible for the overall operation of the system, to a component that maintain a system operation log, or to another entity responsible for remediating system errors. In some implementations, in response to receiving an error message, the primary controller and/or a master controller can reset the system, returning it to step 405. In other implementations, the system can maintain a count of errors, and only after the count reaches a configured threshold, send an error message to one or more of the entities listed above or take other remediating actions. In cases where a small number of transient errors are encountered, maintaining a count can reduce the number of error indicators generated. Optionally, if a configured amount of time passes between errors, the error count can be reset to zero. Upon completion of the remediation, the system can return to step 410 to await a new synch pulse.

Figure 5:
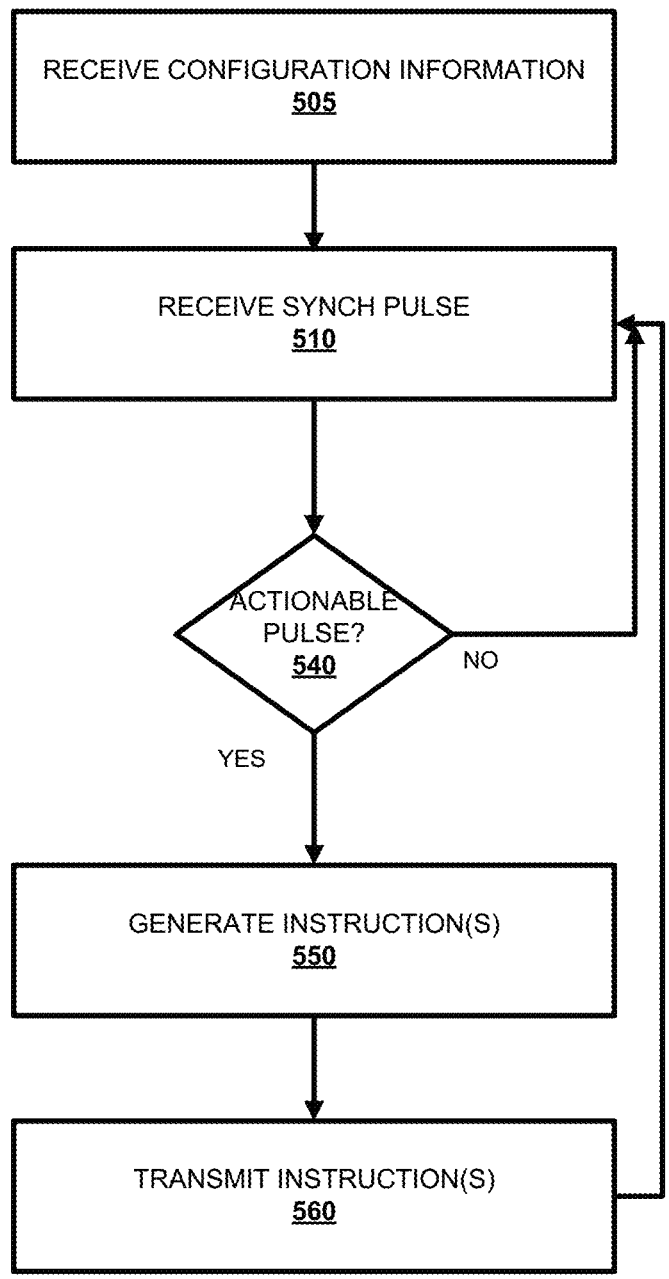

FIG. 5 is a flow diagram of an example process used to synchronize controllers, and more specifically, a process used by a primary controller to operate a device after the primary controller generates a synch pulse. The process is largely analogous to the process executed by a secondary controller, but is described in this specification for completeness.

In step 505, the system receives configuration information. Configuration information was described previously in reference to FIGS. 2 and 3.

In step 510, the system receives a synch pulse. In this case, the primary controller has also generated the synch pulse (FIG. 3, step 340), so the pulse can remain internal to the primary controller.

In decision step 540, the system determines whether the pulse is actionable for at least one device connected to the primary controller. First, the system determines the list of devices attached to the primary controller. Then, for at least one attached device, the system determines the configuration information relevant to that controller. For example, the configuration information can include the pulse offset and frequency for the device operation. (Pulse offset and frequency were described in reference to FIG. 2.) As each pulse is evaluated in step 540, the system increments a pulse count. If the pulse count corresponds to the pulse offset and frequency for at least one device, the system proceeds to step 550 for that device, and conveys an indication of the device(s) that should be activated. If the pulse count does not correspond to the pulse offset and frequency for at least one device, the system returns to step 510 to await a new synch pulse.

In step 550, the system has received, as a result of step 540, a list of devices that are to be activated. The system generates instructions appropriate for the device(s) by using the configuration information obtained in step 505. The instructions will differ by device. For example, for an illumination device, the configuration can include the duration the illumination should last. If the illumination device can illuminate in multiple frequencies, the configuration information can include the frequency to be used. For an imaging device, the configuration can include imaging parameters such as exposure length, aperture, etc., depending on the capabilities of the imaging device.

In step 560, the system passes the instructions generated in step 550 to the one or more activated devices. The instructions can be passed, for example, by a device controller subsystems specific to the device type. Once step 560 is complete, the system can return to step 510 to await a new synch pulse.

Figure 6:
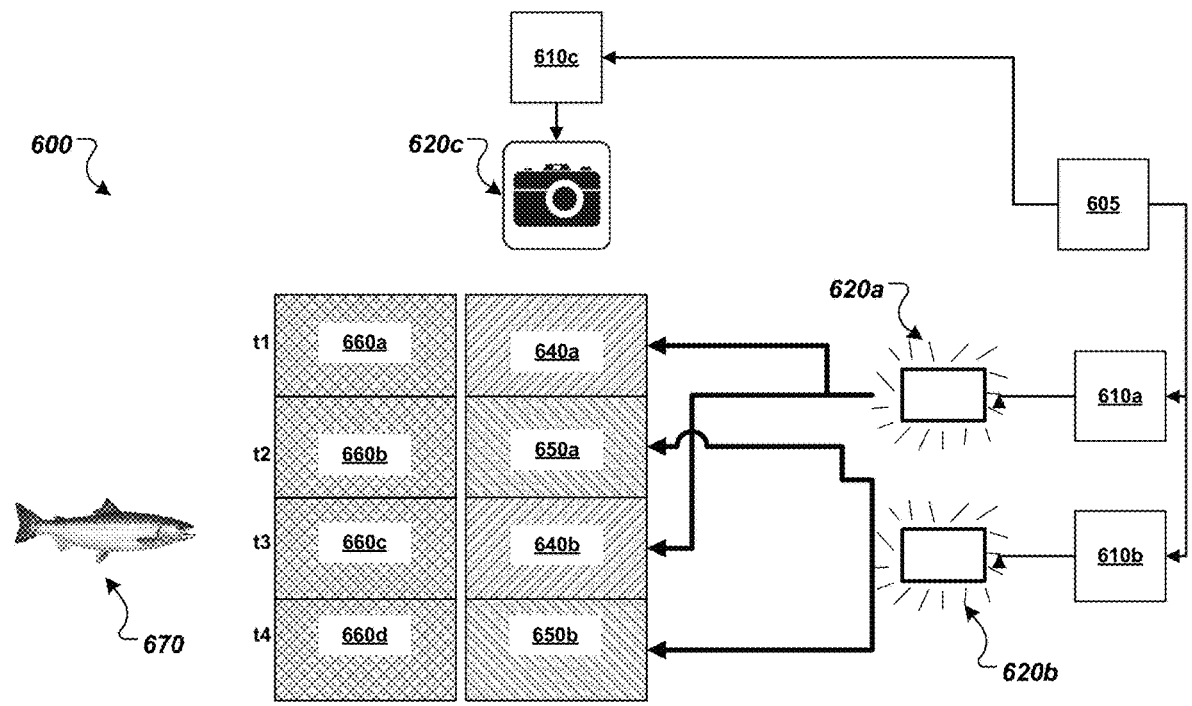
FIG. 6 is an illustration of a framework to synchronize controllers configured to alternate illumination at a frequency beyond a flicker fusion threshold.

FIG. 6 is an illustration of a framework to synchronize controllers configured to alternate illumination at a frequency beyond a flicker fusion threshold. The flicker fusion threshold can be defined as the frequency at which an intermittent light stimulus appears to be completely steady to an observing organism. As discussed previously, attaining flicker fusion by exceeding the flicker fusion threshold is important to the welfare of the organisms in an aquaculture environment.

The FIG. 600 illustrates, at four time periods (t1-t4) illumination (640*a-d*) produced by two illumination devices 620*a*, 620*b* controlled by two controllers, 610*a* 620*b*, both of which have received configuration information 605. The FIG. 600 also illustrates the illumination 660*a-d* as perceived by an organism 670 in the aquaculture environment, and more specifically, flicker fusion achieved by the synchronization framework discussed in this specification.

At time t1, the first controller, 610*a* causes its associated illumination device 620*a* to produce illumination of a first frequency, illustrated as striped lines in 640*a*. At time t2, the second controller, 620*a* causes its associated illumination device 620*b* to produce illumination of a second frequency, illustrated as reversed striped lines in 650*a*. Time t3 repeats the pattern of time t1, and time t4 repeats the pattern of time t2. A controller 610*c*, configured by the configuration information, 605, causes an imaging device 620*c* to capture images of the illuminated region. In this illustration, the imaging device 620*c* captures four images, one each at times t1-t4 and illuminated by alternating frequencies.

Importantly, the configuration information 605 can include configuration parameters controlling the duration of illumination periods—that is, the duration of time periods t1-t4, which in this example are of equal length. By setting a short threshold, which corresponds to a high frequency, the framework can attain flicker fusion for the species of organism in the aquaculture environment. Duration periods of $1/60^{th}$ of a second (corresponding to 60 Hz) can be sufficient to attain flicker fusion. In this example, the organism 670 would perceive constant illumination 660*a-d* at time periods t1-t4 instead of the alternating illumination patterns shown in 640*a*, 650*a*, 640*b*, 650*b*.

To summarize, this figure illustrates how the configuration framework of this specification can allow the synchronization of controllers (610*a* and 610*b*) with each other, allowing for the proper illumination of the target region at times t1-t4 (640*a*-640*b*); the synchronization of the controllers (610*a* and 610*b*) with the imaging controller 610*c*, therefore enabling the capture of valid images; and, through the use of configuration information, enabling proper timing of the controllers (610*a*, 610*b*) to attain flicker fusion (660*a*-660*d*), improving the welfare of the organisms 670 in an aquaculture environment.

While this specification has largely described an implementation of a synchronization framework in the context of detecting parasites on fish in aquaculture environment, other implementations can apply to other living creatures.

In one such implementation, a synchronization framework can be used to detect external parasite on cattle, such as horn flies, lice and grubs. An implementation of the framework can synchronize the operation of controllers associated with illumination devices that illuminate such parasites with controllers associated with imaging devices that capture images of the livestock. Such images can be used for parasite detection. In another implementation, a synchronization framework can be used to detect fungus, such as *Aspergillus parasiticus* and/or *Aspergillus flavus*, on corn. An implementation of the framework can synchronize the operation of controllers associated with illumination devices that emit ultraviolet (UV) light with controllers associated with imaging devices configured to capture images illuminated with UV light. Such images can be used for fungus detection.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving, by a primary controller that manages synchronization among multiple secondary controllers, the primary controller controlling a first device that is different from a secondary controller and each secondary controller of the multiple secondary controllers controlling a corresponding second device different from the first device such that an operation of the first device is synchronized with an operation of at least one second device, the multiple secondary controllers including a particular secondary controller, wherein a first error indicator from the particular secondary controller indicates an out-of-synchronization error condition identified by the particular secondary controller;
    in response to receiving the first error indicator from the particular secondary controller, determining, by the primary controller, a remediation protocol for remediating the out-of-synchronization error condition that was identified by the secondary controller; and
    applying the remediation protocol to restore synchronization among the multiple secondary controllers including the particular secondary controller.

2. The computer-implemented method of claim 1, wherein determining the out-of-synchronization error condition at the particular secondary controller includes determining that a duration between receiving, at the particular secondary controller, a first pulse and a second pulse is greater than a configured threshold.

3. The computer-implemented method of claim 1, wherein the remediation protocol includes transmitting, by the primary controller, a second error indicator to at least one of: a primary device, a master controller, a system logging component, or a remediation system.

4. The computer-implemented method of claim 3 wherein, in response to receiving the second error indicator at the primary device, performing a reset operation of the primary device.

5. The computer-implemented method of claim 1 wherein determining the remediation protocol includes:
    determining whether a count of received error indicators satisfies a configured threshold; and
    in response to determining that the count of received error indicators satisfies the configured threshold, transmitting a second error indicator to at least one of: a primary device, a master controller, a system logging component, or a remediation system.

6. The computer-implemented method of claim 5, wherein determining whether the count of received error indicators satisfies the configured threshold further comprises:
    receiving the second error indicator after receiving the first error indicator;
    incrementing the count of received error indicators; and
    in response to determining that a configured period of time elapsed between receiving the first error indicator and the second error indicator, setting the count of received error indicators to one.

7. The computer-implemented method of claim 1 wherein the particular secondary controller is in an aquaculture environment.

8. A system comprising one or more computers and one or more storage devices storing instructions that when executed by the one or more computers cause the one or more computers to perform operations comprising:

receiving, by a primary controller that manages synchronization among multiple secondary controllers, the primary controller controlling a first device that is different from a secondary controller and each secondary controller of the multiple secondary controllers controlling a corresponding second device different from the first device such that an operation of the first device is synchronized with an operation of at least one second device, the multiple secondary controllers including a particular secondary controller, wherein a first error indicator from the particular secondary controller indicates an out-of-synchronization error condition identified by the particular secondary controller;

in response to receiving the first error indicator from the particular secondary controller, determining, by the primary controller, a remediation protocol for remediating the out-of-synchronization error condition that was identified by the secondary controller; and applying the remediation protocol to restore synchronization among the multiple secondary controllers including the particular secondary controller.

9. The system of claim 8, wherein determining the out-of-synchronization error condition at the particular secondary controller includes determining that a duration between receiving, at the particular secondary controller, a first pulse and a second pulse is greater than a configured threshold.

10. The system of claim 8, wherein the remediation protocol includes transmitting, by the primary controller, a second error indicator to at least one of: a primary device, a master controller, a system logging component, or a remediation system.

11. The system of claim 10 wherein, in response to receiving the second error indicator at the primary device, performing a reset operation of the primary device.

12. The system of claim 8 wherein determining the remediation protocol includes:

determining whether a count of received error indicators satisfies a configured threshold; and in response to determining that the count of received error indicators satisfies the configured threshold, transmitting a second error indicator to at least one of: a primary device, a master controller, a system logging component, or a remediation system.

13. The system of claim 12, wherein determining whether the count of received error indicators satisfies the configured threshold further comprises:

receiving the second error indicator after receiving the first error indicator;

incrementing the count of received error indicators; and in response to determining that a configured period of time elapsed between receiving the first error indicator and the second error indicator, setting the count of received error indicators to one.

14. The system of claim 8 wherein the particular secondary controller is in an aquaculture environment.

15. One or more non-transitory computer-readable storage media storing instructions that when executed by one or more computers cause the one or more computers to perform operations comprising:

receiving, by a primary controller that manages synchronization among multiple secondary controllers, the primary controller controlling a first device that is different from a secondary controller and each secondary controller of the multiple secondary controllers controlling a corresponding second device different from the first device such that an operation of the first device is synchronized with an operation of at least one second device, the multiple secondary controllers including a particular secondary controller, wherein a first error indicator from the particular secondary controller indicates an out-of-synchronization error condition identified by the particular secondary controller;

in response to receiving the first error indicator from the particular secondary controller, determining, by the primary controller, a remediation protocol for remediating the out-of-synchronization error condition that was identified by the secondary controller; and applying the remediation protocol to restore synchronization among the multiple secondary controllers including the particular secondary controller.

16. The one or more non-transitory computer-readable storage media of claim 15, wherein determining the out-of-synchronization error condition at the particular secondary controller includes determining that a duration between receiving, at the particular secondary controller, a first pulse and a second pulse is greater than a configured threshold.

17. The one or more non-transitory computer-readable storage media of claim 15, wherein the remediation protocol includes transmitting, by the primary controller, a second error indicator to at least one of: a primary device, a master controller, a system logging component, or a remediation system.

18. The one or more non-transitory computer-readable storage media of claim 17 wherein, in response to receiving the second error indicator at the primary device, performing a reset operation of the primary device.

19. The one or more non-transitory computer-readable storage media of claim 15 wherein determining the remediation protocol includes:

determining whether a count of received error indicators satisfies a configured threshold; and in response to determining that the count of received error indicators satisfies the configured threshold, transmitting a second error indicator to at least one of: a primary device, a master controller, a system logging component, or a remediation system.

20. The one or more non-transitory computer-readable storage media of claim 19, wherein determining whether the count of received error indicators satisfies the configured threshold further comprises:

receiving the second error indicator after receiving the first error indicator;

incrementing the count of received error indicators; and in response to determining that a configured period of time elapsed between receiving the first error indicator and the second error indicator, setting the count of received error indicators to one.

\* \* \* \* \*